United States Patent
Ekin

(10) Patent No.: US 9,928,737 B2
(45) Date of Patent: Mar. 27, 2018

(54) MOBILE NUMBER PLATE RECOGNITION AND SPEED DETECTION SYSTEM

(71) Applicant: EKIN TEKNOLOJI SANAYI VE TICARET ANONIM SIRKETI, Istanbul (TR)

(72) Inventor: Akif Ekin, Istanbul (TR)

(73) Assignee: EKIN TEKNOLOJI SANAYI VE TICARET ANONIM SIRKETI, Istanbul (TR)

( * ) Notice: Subject to any disclaimer, the term of this patent is extended or adjusted under 35 U.S.C. 154(b) by 358 days.

(21) Appl. No.: 14/777,522

(22) PCT Filed: Dec. 20, 2013

(86) PCT No.: PCT/TR2013/000365
§ 371 (c)(1),
(2) Date: Sep. 16, 2015

(87) PCT Pub. No.: WO2014/193319
PCT Pub. Date: Dec. 4, 2014

(65) Prior Publication Data
US 2016/0293002 A1   Oct. 6, 2016

(30) Foreign Application Priority Data
May 27, 2013   (TR) .................. a 2013 06294

(51) Int. Cl.
*G08G 1/054*   (2006.01)
*B60Q 1/50*   (2006.01)
(Continued)

(52) U.S. Cl.
CPC ............. *G08G 1/054* (2013.01); *B60Q 1/50* (2013.01); *G01S 13/867* (2013.01); *G01S 19/13* (2013.01); *G08G 1/0175* (2013.01); *G01S 13/91* (2013.01)

(58) Field of Classification Search
CPC ........ G06K 9/00; G06K 9/325; G06K 9/2054; G08G 1/04; G08G 1/054; G08G 1/017;
(Continued)

(56) References Cited

U.S. PATENT DOCUMENTS 5,528,246 A * 6/1996 Henderson .............. G01S 7/415
                                                   342/115
5,729,016 A * 3/1998 Klapper ................... B60R 1/00
                                                   250/332

(Continued)

FOREIGN PATENT DOCUMENTS

EP     1374152 A1    1/2004
EP     2088568 A2    8/2009

OTHER PUBLICATIONS

Zhang Yanlin: "Technique study for vehicle license plate recognition based on semiconductor laser night vision", Computer Design and Applications(ICCDA), 2010 International.
(Continued)

*Primary Examiner* — Peter M Bythrow
(74) *Attorney, Agent, or Firm* — Gokalp Bayramoglu

(57) ABSTRACT

The invention which is mobile number plate recognition and speed detection apparatus (1) placed on the vehicles, i.e., police vehicle, with the aim of security, characterized in comprising camera (1.3) which is placed at two sides of the base—front right and front left—and enables the apparatus to capture image; LED lightings (1.4) which are disposed around the cameras (1.3) and face the direction of vision and provide capturing recognizable image at nights; police lights (1.5) which are placed to the front and rear surfaces of said base (1.2) and flash when necessary; alarm control device (1.8) adjusting the alarm; Ethernet connection (1.9) constituting the network; cooling device (1.10) eliminating the heat inside the apparatus; control card (1.11) controlling the
(Continued)

police lights; 3G modem (1.12) providing wireless connection constantly; and upper cover (1.1) covering the entire apparatus by surrounding it.

7 Claims, 2 Drawing Sheets

(51) Int. Cl.
    *G01S 13/86*         (2006.01)
    *G01S 19/13*         (2010.01)
    *G08G 1/017*        (2006.01)
    *G01S 13/91*        (2006.01)

(58) Field of Classification Search
    CPC ...... G08G 1/0175; G08G 10/52; G01S 13/91; G01S 13/92; G01S 13/867
    USPC .......................................................... 342/70
    See application file for complete search history.

(56) References Cited

U.S. PATENT DOCUMENTS

| | | | | |
|---|---|---|---|---|
| 5,902,351 A * | 5/1999 | Streit | ................. | G01C 21/28 340/990 |
| 5,948,038 A * | 9/1999 | Daly | ................. | G08G 1/04 340/933 |
| 6,161,066 A * | 12/2000 | Wright | ................. | B60Q 1/2611 340/468 |
| 6,795,237 B1 * | 9/2004 | Marinelli | ................. | G02B 23/12 359/353 |
| 8,704,889 B2 * | 4/2014 | Hofman | ................. | G06K 9/209 348/143 |
| 9,025,028 B2 * | 5/2015 | Mitic | ................. | G06K 9/325 348/148 |
| 2002/0140577 A1 * | 10/2002 | Kavner | ................. | G07B 15/06 340/933 |
| 2003/0007074 A1 * | 1/2003 | Nagaoka | ................. | H04N 7/18 348/148 |
| 2005/0029347 A1 * | 2/2005 | Noble | ................. | G06K 9/2018 235/384 |
| 2009/0202105 A1 * | 8/2009 | Castro Abrantes | .... | G07B 15/06 382/100 |
| 2012/0201041 A1 * | 8/2012 | Gergets | ................. | B60Q 1/2611 362/493 |
| 2013/0066542 A1 * | 3/2013 | Chung | ................. | G08G 1/04 701/119 |
| 2013/0170711 A1 * | 7/2013 | Chigos | ................. | G06K 9/325 382/105 |
| 2014/0111647 A1 * | 4/2014 | Atsmon | ................. | H04N 7/185 348/148 |
| 2014/0369566 A1 * | 12/2014 | Chigos | ................. | G06K 9/325 382/105 |
| 2017/0075888 A1 * | 3/2017 | Ekin | ................. | G06F 17/3028 |

OTHER PUBLICATIONS

Conference on, IEEE, Piscataway, NJ, USA Jun. 25, 2010, pp. V4-416-V4-419, XP031726455.

\* cited by examiner

MOBILE NUMBER PLATE RECOGNITION AND SPEED DETECTION SYSTEM

TECHNICAL FIELD

The invention is related to eliminating the drawbacks often encountered in the use of number plate recognition (image processing) and speed detection (radar) devices.

The invention, in order to be placed on the moving elements with the aim of security such as police vehicle, is particularly related to detecting the speed of all vehicles moving and/or stationary in traffic by forming a mobile apparatus bringing number plate recognition and speed detection device together; recognizing the number plates thereof; checking the registry thereof; giving a warning when necessary; and a speed detection apparatus informing the related units. The invention performs all the functions even while police vehicle is moving.

STATE OF THE ART

Today, vehicles are described with plate numbers having the attribution of identity in some way. With their original structures, number plates enable the vehicles to be differed from one another and to be recognized each separately. Traffic registry records, vehicle taxes, motorway charges, etc., are recorded by being evaluated through these numbers.

Considering that the vehicles are elements constantly moving, it is necessary that plate numbers thereof should be detected accurately and required procedures should be applied thereto. Until recently this detection process has been performed by people using conventional methods, which has led to time lags and even more importantly to many errors. In addition, due to the vehicle density and large living spaces (streets, roads, etc.), the number of people to be employed increases.

In order to eliminate the above mentioned drawbacks, automatic camera systems for number plate recognition process are developed. The European Patent numbered EP2088568 and titled "Automatic license plate recognition system integrated in an electronic toll collection system" provides nonstop charging of the vehicles and recording the charges for the number plates thereof. For this purpose, the system detects the plate numbers by capturing the images of both front and rear of the vehicle by cameras, thanks to the special software thereof.

Mobile Electronic System Integration (MOBESE) which is being commonly used today, operates in same way as well. One of the features of MOBESE cameras placed in a stable manner to certain points of the city, particularly to points of entry and exist, is to recognize number plates by capturing the images of vehicles entering field of vision constantly and to inform the related units when necessary.

The above mentioned systems perform number plate recognition function although they bring about some drawbacks as well. These systems cannot be positioned in a stable manner as they do not comprise software in an algorithm to perform number plate recognition in the event of high power requirements and while moving. In addition, since these systems can recognize number plates in limited areas, the success rate thereof is low.

The European Patent numbered EP1374152 and titled "An automatic number plate recognition system" provides a handheld system consisting of camera and a personal computer in order to solve above mentioned drawbacks. Despite being mobile, said system brings about many drawbacks when human elements take part.

In the current art, number plate recognition systems operate integrated with speed detection devices. In this way, not only traffic control is provided but also those exceeding the legal speed limits are detected. However, this type of systems cannot be positioned in a stable manner due to the above mentioned reasons.

As a result, it is required to make a development in the related technical field due to the requirement for mobile number plate recognition and speed detection apparatus which is positioned on the moving vehicles e.g., security vehicles; can recognize number plates of all vehicles moving and/or parking in traffic; can detect the speed thereof; can check the obtained information in the database thereof or other databases remotely; can send audible and visual warning to the user and related authorities in the event of number plate detection of vehicles searched, and due to the inadequacy of the existing solutions.

OBJECT OF THE INVENTION

The object of the invention is to have different technical features offering a new development in this field different from the embodiments used in the current art.

The main object of mobile number plate recognition and speed detection apparatus is to enable security forces e.g., traffic police, to provide traffic control and order while moving.

Said mobile number plate recognition and speed detection apparatus constitutes a compact apparatus where number plate recognition system, speed detection device, the server connected thereto, warning apparatus and security vehicle flashers are assembled.

Another object of the invention is to inform the user about the checking results by checking the obtained information in the database thereof or other databases.

Another object of the invention, when positioned to moving vehicles, is to provide recognizing the number plates of the vehicles moving and parking and detecting the speeds thereof.

Another object of the invention is to inform the user about the checking results by checking the obtained information in the database thereof or other databases.

Another object of the invention is to send audible and visual warning to the user and related authorities in the event of number plate detection of vehicles searched during checking.

FIGURES FOR HELPING UNDERSTANDING THE INVENTION

PART REFERENCES

Figure 1:
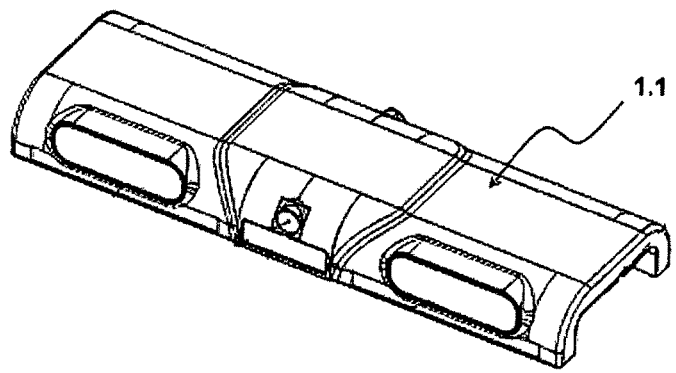
FIG. 1 is the upper cover view of mobile number plate recognition and speed detection apparatus according to the invention.
Figure 2:
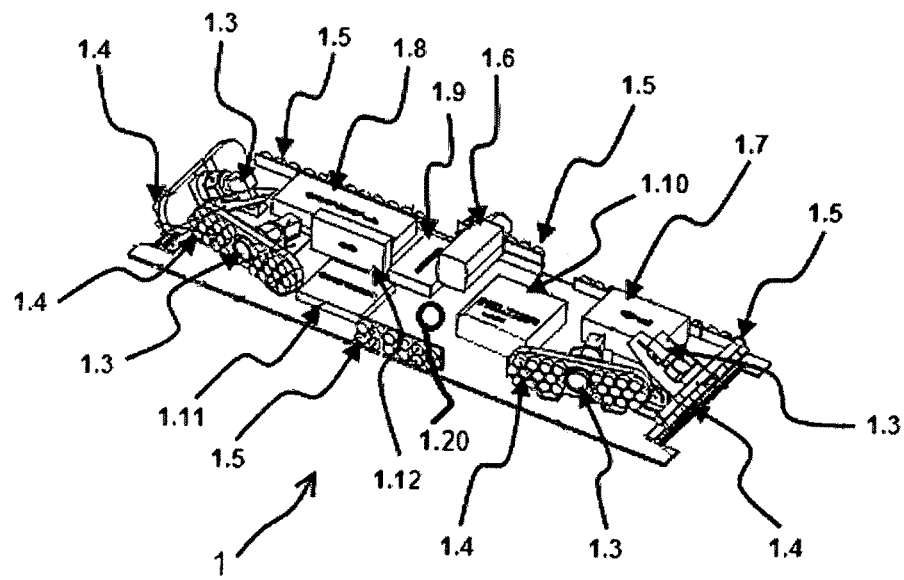
FIG. 2 is the general view of air suction port from exterior facade according to the invention.
Figure 3:
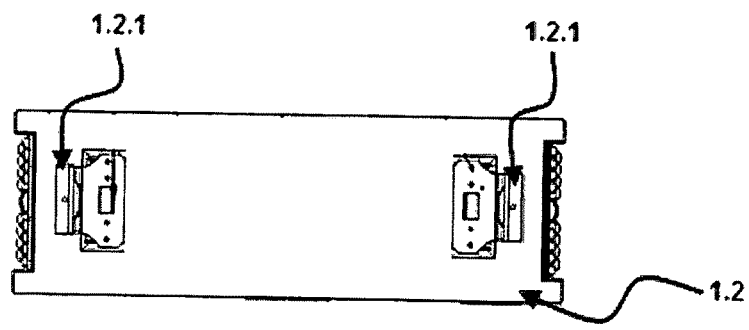
FIG. 3 is the bottom view of mobile number plate recognition and speed detection apparatus according to the invention.
Figure 4:
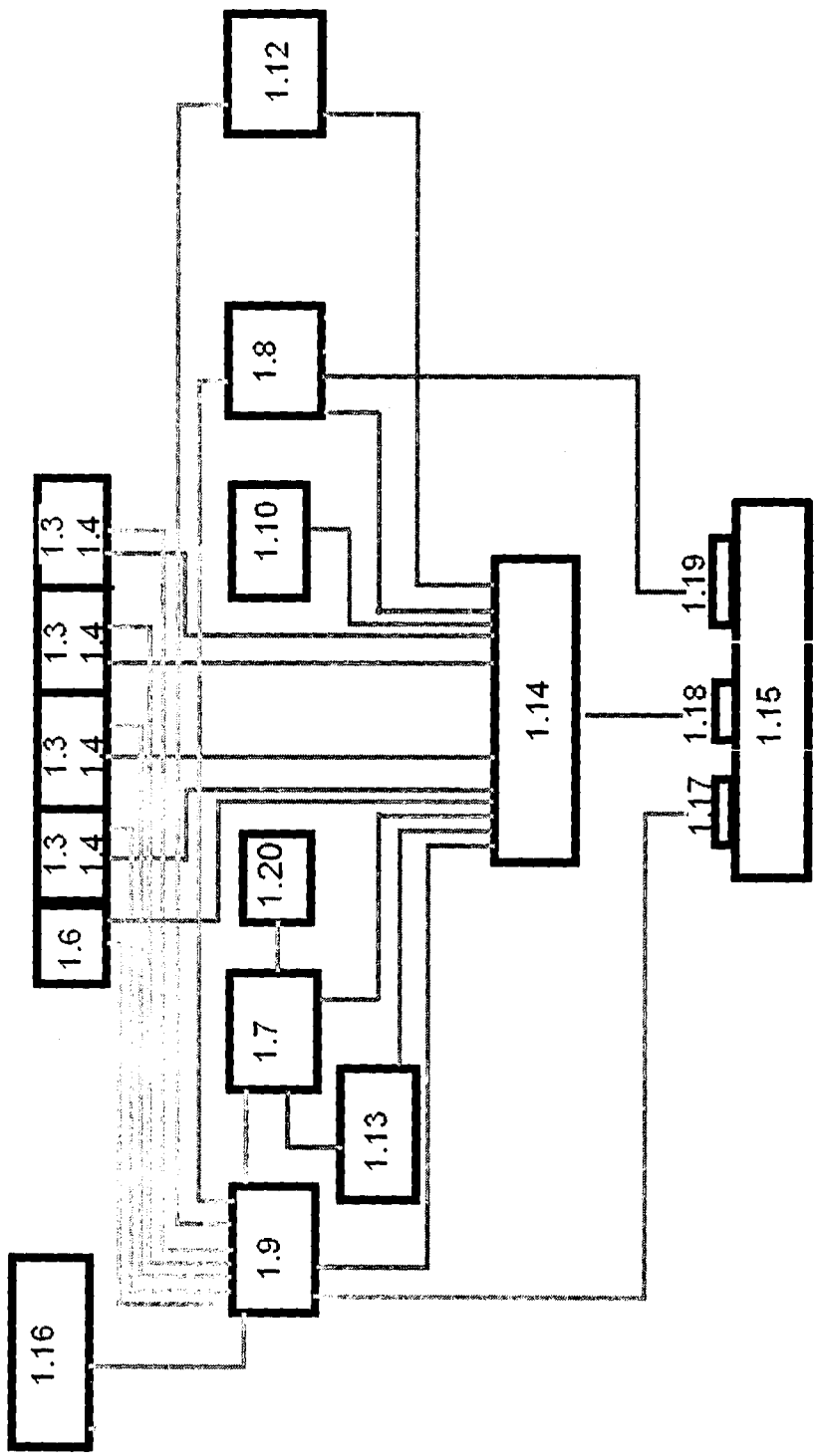
FIG. 4 is the close view of air suction port from interior facade.

1 Speed detection apparatus
1.1 Upper cover
1.2 Base
1.2.1 Mounting apparatus 1.3 Camera
1.4 Led lighting
1.5 Police lights
1.6 General view camera
1.7 Recording device
1.8 Alarm control device
1.9 Ethernet connection
1.10 Cooling device
1.11 Control card
1.12 3G modem
1.13 Radar
1.14 Electric terminal
1.15 Connector
1.16 Client
1.17 Network
1.18 VDC
1.19 Alarm
1.20 GPS

DETAILED DESCRIPTION OF THE INVENTION

The invention which is mobile number plate recognition and speed detection apparatus (1) placed on the vehicles, i.e., police vehicle, with the aim of security, characterized in comprising mounting apparatus (1.2.1) which enables the said mobile number plate recognition and speed detection apparatus (1) to be connected to the vehicle; base (1.2) to which mounting apparatus (1.2.1) is positioned and which constitutes structural skeleton of the apparatus; camera (1.3) which is placed at two sides of the base (1.2)—front right and front left—and enables the apparatus to capture image; LED lightings (1.4) which are disposed around the cameras (1.3) and face the direction of vision and provide capturing recognizable image at nights; general view camera (1.6) which is positioned at the rear of the base (1.2), can analyze the image by itself thereinside, can register the data used by central software and can be controlled by the software with suitable protocol; police lights (1.5) which are placed to the front and rear surfaces of the base (1.2) and flash when necessary; recording device (1.7) which is positioned on the base (1.2) and where the images and data are stored and the server is disposed; alarm control device (1.8) adjusting the alarm (1.19); Ethernet connection (1.9) constituting the network; cooling device (1.10) eliminating the heat inside the apparatus; control card (1.11) controlling the police lights; 3G modem (1.12) providing wireless connection constantly; upper cover (1.1) covering the entire apparatus by surrounding it; and GPS module (1.20) by which information about the position and infraction of all number plates are obtained.

Said mobile number plate recognition and speed detection apparatus (1) operates with 12 VDC (1.18) power. By this means a portable power supply is sufficient and the apparatus does not necessarily stand in a stable position. Client (1.16) and network (1.17) systems are also used in speed detection apparatus (1).

Said mobile number plate recognition and speed detection apparatus (1) can recognize number plates of all vehicles in 180 degree angle in front of the vehicle by capturing the image thereof thanks to the cameras (1.3) and detects the speed thereof as well.

Said mobile number plate recognition and speed detection apparatus (1) can reduce the energy consumption to a minimum level thanks to LED lightings (1.4) and recognize the number plates by capturing the image of the vehicles at nights as well.

Said mobile number plate recognition and speed detection apparatus (1) can also detect the speed of the vehicle.

One local file and database server are disposed in recording device (1.7). Related data are transferred to these local servers and to central server with 3G modem (1.12) or wireless connection and then recorded. Software on said recording device (1.7) has an algorithm which can process the images captured while the apparatus is operating and can perform speed detection.

Mobile number plate recognition and speed detection apparatus (1) can operate both when the vehicle is moving and stationary. Cameras (1.3) are constantly shooting while operating and send the image to the file server in recording device (1.7). The image transferred to the server is processed thanks to the special software on the server, the number plate marks in the content thereof are recognized and registered to database (SQL) server. The photograph of the vehicle captured simultaneously with number plate image can serve as an evidence, and thus is transferred to the file server. At the time when vehicle number plate, is recognized, the speed information thereof is taken from synchronized three-dimensional radar (1.13) with RS-485 connection and added to database. Software on the server reaches to speed limit information belonging to the area it is present by using GPS (Global Positioning System) on 3G modem (1.12) and upon detecting a vehicle exceeding the speed limit, it records the related number plate of the vehicle about the speed infraction to database. Moreover, the number plate of each vehicle is recorded with GPS information and thus, the information about when and which areas the vehicle is passing from, can be obtained when a search is carried out.

Mobile number plate recognition and speed detection apparatus (1) can make power, network, and alarm connections by means of connector (1.15). Power is distributed to components inside the apparatus by means of electric terminal (1.14). Thanks to the network connection, the user can instantly follow the information obtained by the apparatus inside the vehicle from data process device. The user can question and check, report the incident and penalize when necessary. Cameras (1.3) constantly operate with the aim of security and the user can reach to records through data process device.

3G modem (1.12) is constantly sending the position information, whole vehicle information (e.g., number plate, image, and speed) to a distant center. Not only security of the vehicle is provided by being monitored and fast intervention becomes possible but questioning process of the number plate (in order to catch illegal, stolen or searched vehicles) is performed as well.

Alarm control device (1.8) can control the apparatus thanks to DI and DO sensors. It can alert automatically or with the user order when necessary.

The invention claimed is:
1. A mobile number plate recognition and speed detection apparatus placed on a vehicle, comprising:
   a mounting apparatus which enables said speed detection apparatus to be connected to the vehicle;
   a base to which mounting apparatus is positioned and which constitutes a structural skeleton of the apparatus;
   at least two cameras, respectively placed on a left portion of a front side of said base and on a right portion of a front side of said base, and enables the apparatus to capture an image;
   a plurality of LED lights disposed around the camera, face a direction of vision and capture a recognizable image at nights;

a general view camera positioned at the rear of the base, to analyze the image;

a plurality of police lights placed at the front and rear surfaces of said base;

a recording device positioned on said base (1.2), wherein the image and data are stored in the recording device and the server is disposed in the recording device;

an alarm control device;

an ethernet connection constituting a network;

a cooling device eliminating heat inside the apparatus;

a control card controlling the police lights;

a 3G modem providing a wireless connection;

an upper cover covering the entire apparatus by surrounding said mobile number plate recognition and speed detection apparatus;

and a GPS module by which information about positions and infractions of all number plates are obtained.

2. The mobile number plate recognition and speed detection apparatus according to claim 1, further comprising a portable 12 VDC power supply.

3. The mobile number plate recognition and speed detection apparatus according to claim 1, further comprising a radar, obtaining speed information with a RS-485 connection and adding the speed information to a database.

4. The mobile number plate recognition and speed detection apparatus according to claim 1, further comprising an electric terminal, providing power distribution to components inside the apparatus.

5. The mobile number plate recognition and speed detection apparatus according to claim 1, further comprising software, having an algorithm to perform speed detection and process the images captured while the apparatus is operating.

6. The mobile number plate recognition and speed detection apparatus according to claim 1, further comprising a connector, providing connections for power, the network, and an alarm.

7. The mobile number plate recognition and speed detection apparatus according to claim 1, further comprising client and network systems.

* * * * *